Jan. 21, 1930.  C. Y. KNIGHT  1,744,048
BEARING CONSTRUCTION
Filed May 21, 1924
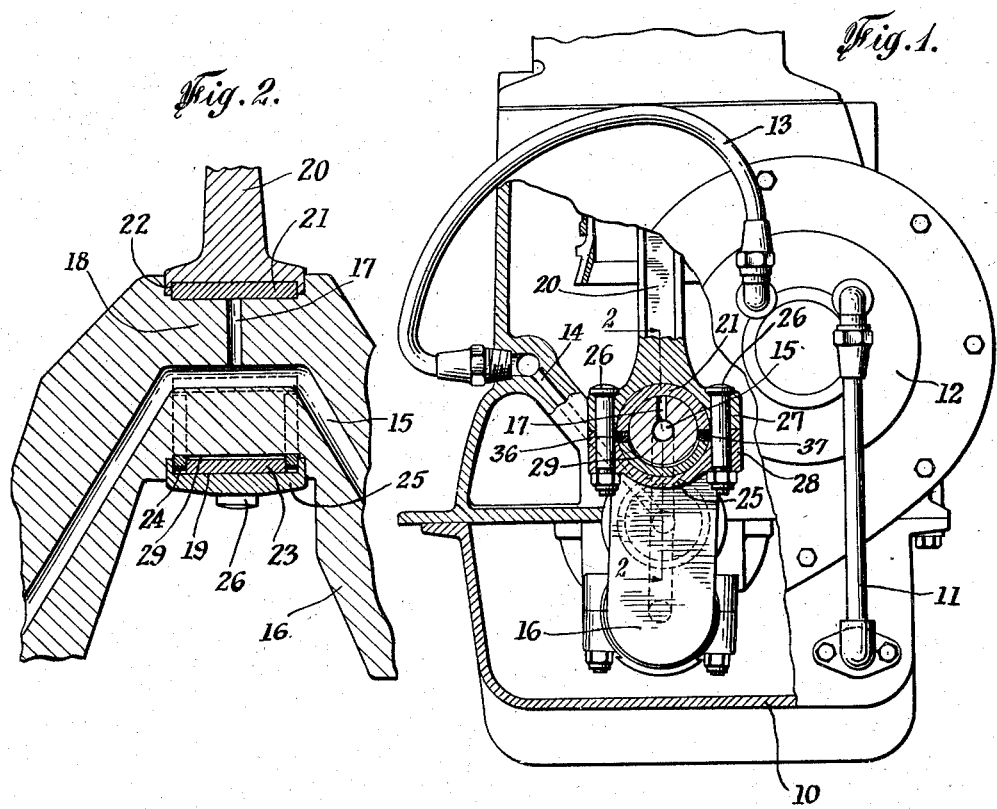
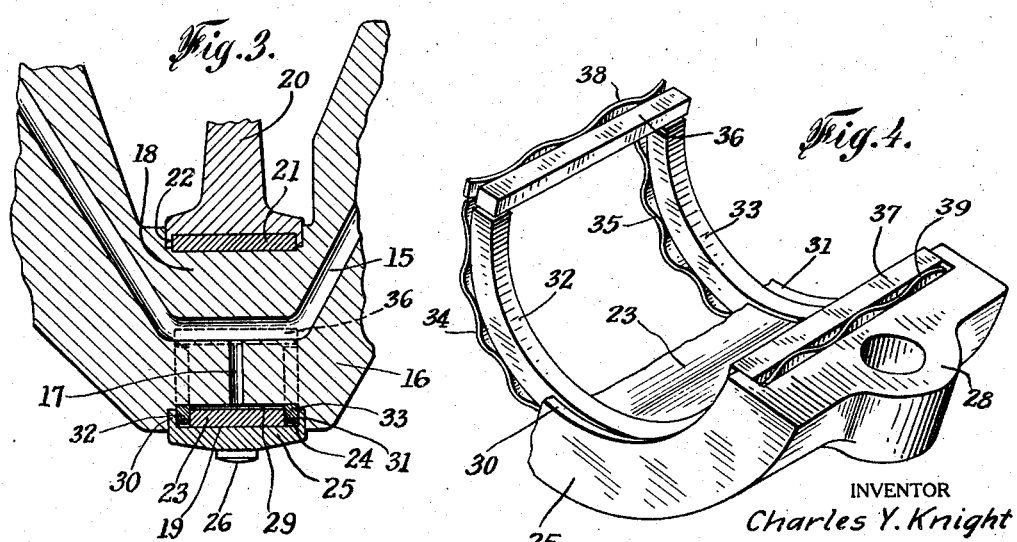
INVENTOR
Charles Y. Knight
BY
Braselton, Whitcomb & Desjardins
ATTORNEYS Patented Jan. 21, 1930

1,744,048

UNITED STATES PATENT OFFICE

CHARLES Y. KNIGHT, OF PASADENA, CALIFORNIA

BEARING CONSTRUCTION

Application filed May 21, 1924. Serial No. 714,771.

This invention relates to bearings and, more particularly, to a self adjusting bearing for reciprocating parts, such as the bearings between the connecting rods and crank shaft of an internal combustion engine. More particularly, the invention relates to a bearing construction by which lubricant may be effectively distributed and held in place in a bearing.

Lubricants are employed in bearings to prevent complete contact between the surface of the bearing and that of the journal enclosed therein, and also fill the space between the journal and bearing, thus taking up clearance, cushioning the impact of the surfaces resulting through the momentum of the reciprocating parts, and preventing the noises and vibration that would result therefrom. Within limits, a bearing will be quiet or noisy in proportion to the quality and character of the lubricant used therein, a heavy, viscous lubricant, which offers great resistance to movement or displacement, rendering the bearings quieter than a thin lubricant, and permitting a looser bearing to be used. The momentum of the reciprocating parts, acting against the resistance offered by the viscosity of the lubricant, however, tends to squeeze or displace the lubricant out of the bearing and cause it to flow around the journal between the journal and bearing surfaces from the top to the bottom of the bearing, thus thinning out the film of lubricant under the impact of the reciprocating parts to such an extent that a distinct sound and vibration results. The revolution of the journal surface in contact with the film of lubricant, acting as a conveyor, also tends to carry the lubricant centrifugally from that portion of the frictional surfaces where it could cushion the momentum of the reciprocating members.

These lubricant displacing actions are effectively resisted by my present invention, an object of which is to provide a bearing in which the movement of the lubricant from between the frictional surfaces under the impact of reciprocating parts is opposed or prevented.

Another object of my present invention is to provide means for trapping or retaining a pool of lubricant between the bearing and journal in position to cushion or absorb the impact of blows acting on either of the relatively moving parts, as, for instance, the impact due to the explosion in an internal combustion engine.

Another object of the invention is to provide a bearing construction in which the lubricant will effectively act as an automatic take-up of clearance between the bearing and journal surfaces.

Other objects of the invention are to provide a bearing construction in which a wiping action is provided against the journal surface to prevent or oppose the carrying of lubricant around the journal surface, and to provide a journal bearing construction in which the bearing and journal surfaces are held together as closely as the thinnest film of lubricant will permit even though a comparatively loose bearing is employed.

With these and other objects in view, which may be perceived from the following specification, the invention may be embodied in the mechanism described and set forth in the following specification. My invention is pointed out and defined in the appended claims.

The various features of the invention are illustrated in the accompanying drawings, in which:

Fig. 1 is an end view, partly in section, of a crank case and crank shaft of an internal combustion engine, showing an embodiment of the present invention, Fig. 2 is a longitudinal sectional view through a portion of a crank shaft and connecting rod embodying my present invention, the crank and connecting rod being in a position to receive the thrust of the piston on the explosion, Fig. 3 is a longitudinal sectional view similar to that of Fig. 2 but showing the crank shaft in the opposite position of rotation, and Fig. 4 is a detail perspective view of the bearing cap of a connecting rod and the corresponding portion of the bearing, portions being broken away to more clearly illustrate its construction.

In my present invention, the lubricant is held from being forced out of the ends of the bearing by half ring members, which fit in grooves near each end of the bearing and are pressed against the journal surface by suitable spring devices, and the forcing or carrying of lubricant around or about the journal is opposed or prevented by means of a transverse dam, or dams, extending in longitudinal grooves in the bearing and pressed against the journal surface. When applied to a crank shaft, in which the lubricant is supplied from a channel or passageway within the shaft, lubricant is received in a space enclosed by these rings and dams and, as the bearing rotates relatively to the crankshaft journal on which it is mounted, this lubricant is trapped and held in position against the conveyor action of the journal surface and the pressure caused by the momentum of the reciprocating connecting rod. The trapped layer of lubricant, accordingly, holds the journal in position tightly against the opposite surface of the bearing so that there will be no hammering or relative movement between the journal and the bearing as the connecting rod again receives an impulse from the piston.

Referring more particularly to the accompanying drawings, the invention is illustrated as applied to an internal combustion engine in which lubricant to be circulated to the connecting rod bearings is drawn from the crank case 10 of the engine, through a pipe 11, to a circulating pump 12 and forced through a delivery pipe 13 to a passage 14 in the crank case connecting at its end to one end of a passage 15 extending through a crank shaft 16. From the passage 15 the lubricant flows through branch passage 17, extending radially outwardly, in the wrist portions 18 of the crank shaft to the bearings 19 at the lower ends of the connecting rods 20.

The bearing 19 is preferably formed, in the usual manner, of an upper semi-cylindrical member 21 mounted on the lower end of the connecting rod, which is suitably recessed as at 22, to receive the member 21, and of a lower, semi-cylindrical member 23 mounted in a recess 24 in the bearing cap 25 attached to the end of the connecting rod by means of bolts 26, passing in the usual manner through suitable lugs 27 and 28 on the lower end of the connecting rod and the bearing cap, respectively. The cap 25 may be spaced or adjusted on the end of the connecting rod by means of shims or equivalent devices to provide a desired amount of clearance between the bearing and the surface of the wrist pin journal as indicated at 29.

During the driving or explosion stroke of the piston, the downward thrust of the connecting rod on the crank shaft presses the upper semi-cylindrical member 21 tightly against the surface of the wrist pin journal, leaving but a thin film of lubricant, sufficient to prevent a direct contact between the two surfaces. During this stroke and the first portion of the return stroke, the clearance is mainly, or entirely, between the opposite face of the crank shaft journal and the semi-cylindrical bearing, 23. During the lower portion of this stroke, therefore, the lubricant supplied through the passage 15 and branch passage 17 flows into and fills the clearance space 29, the pressure under which the lubricant is supplied being sufficient for this purpose.

When the connecting rod, 20, reaches the top of the stroke, the momentum of the rod and piston tends to cause the rod to continue its upward movement so that the clearance space, 29, would be between the bearing member, 21, and the upper surface of the journal, and when the explosion takes place the direction of travel is reversed and the connecting rod would be moved relative to the journal so as to bring the clearance space, 29, between the bearing member, 23, and the lower surface of the journal. The forces acting on the connecting rod are of sufficient magnitude to smash through and squeeze out the film of lubricant in such clearance space, in the usual bearing construction, and a distinct knock or noise results which is highly objectionable. My invention contemplates the retaining of a pool of lubricant in the clearance between the bearing and journal which prevents this vibrating or shifting movement and prevents any knock or noise resulting therefrom.

By my present invention, both the endwise escapement and the carrying of lubricant about the journal are prevented. To prevent the endwise escapement of lubricant, I provide end dams. In the embodiment illustrated, spaces or channels are provided between the sides of the lower semi-cylindrical bearing member 23 and end flanges 30 and 31 formed at the sides of the bearing cap, 25, in which spaces are mounted half rings or semi-cylindrical dams, 32 and 33. The half rings, 32 and 33, are yieldingly pressed inwardly against the surface of the journal by any suitable means, such as the corrugated springs 34 and 35, respectively, and serve to prevent the endwise escape of lubricant in a manner analogous to the action of piston rings on the surface of a cylinder.

The escape or carrying of lubricant around the journal, 18, is prevented by means of the transverse dams 36 and 37, extending longitudinally of the bearing between the upper and lower semi-cylindrical bearing members, 21 and 23, and pressed inwardly against the surface of the journal by any suitable means such as the corrugated springs, 38 and 39, respectively, confined between the dams and the inner surface of the bearing cap, 25. The corrugated springs, 38 and 39, press the dams, 36 and 37, respectively, against the adjacent surface of the journal, preventing the passage of lubricant around the journal as a result of the working pressures to which the bearing is subjected. Moreover, as the dams have a wiping action on the journal surface, they prevent or oppose the tendency for lubricant to be carried about the bearing by adhesion to the relatively rotating journal surface. By such means, it will be observed, I am enabled to trap and retain a pool of lubricant in the clearance space of the bearing which prevents vibration of the bearing relative to the journal under the pressures and forces to which the bearing is subjected. It is to be noted that, when the parts are in the position shown in Fig. 2, that is, at the beginning of the power stroke, the pool of lubricant trapped in the clearance space, 29, is cut off from the passage, 17, by the transverse dams and, therefore, the pressure exerted by the explosion cannot force lubricant from the pool back through the passage 17, against the pressure of pump, 12. On the other hand, at the end of the power stroke when the parts are in the position shown in Fig. 3, the passage, 17, communicates with and may feed lubricant to the pool to compensate for any that may have escaped.

My invention is highly useful in connection with the connecting rod bearings of internal combustion engines but it is also useful in connection with other bearings for preventing vibration of the shaft or journal in the bearing. In some cases where the journal rotates in but one direction and the main force tending to displace the lubricant is the conveyor action of the journal surface, it may be necessary to employ but one transverse dam. In such cases, I prefer to employ circular rings as end dams.

In the embodiment of the invention illustrated in the present instance, during the lower portion of the stroke, when the passageway 17 is in communication with the clearance space surrounded or enclosed by the half rings 32 and 33 and the dams 36 and 37, the clearance space is filled with lubricant supplied under pressure through the passage 17. This pressure is ordinarily not sufficient to hold the lubricant in position against the explosion or momentum impacts. As the journal surface revolves in the bearing, the end of the passage 17 passes under the dam 36 or 37 and the lubricant remains trapped in the clearance space and offers a resistance to movement of the bearing and journal surface toward each other equivalent to that which would be offered by a solid metal filling. When the connecting rod is again driven downwardly by an explosion within the engine cylinder, there is, therefore, no clearance space between the opposing bearing and journal surfaces. By means of the arrangement of enclosing dams, the lubricant effectively fills the clearance space and presses the face on the opposite side of the journal against the opposite bearing surface, preventing movement therebetween and thus providing an automatic take-up regardless of the tightness or looseness of the bearing.

As many changes of construction may be made within the scope of my invention, I desire that all matter contained in the above description or shown in the accompanying drawings shall be interpreted as illustrative and not in a limiting sense.

Having thus described my invention, what I claim as new and useful and desire to secure by Letters Patent is:

1. A device of the type described comprising a bearing, means sealing the ends of said bearing against longitudinal escape of lubricant, said bearing having a groove extending transversely of the surface thereof, a solid dam mounted in said groove, means resiliently pressing said dam away from the bottom of said groove, and means to intermittently supply said bearing surface with lubricating fluid.

2. A device of the type described comprising a bearing having a transverse groove in the surface thereof, a solid dam in said groove, resilient means pressing said dam away from the bottom of said groove and means to intermittently supply said bearing surface with lubricating fluid.

3. A device of the type described comprising a bearing, a pair of spaced transverse solid dams in said bearing to oppose the circumferential movement of lubricant over the bearing surface, means for opposing the longitudinal escape of lubricant from the space between said dams, and means to intermittently supply the surface between said dams with lubricating fluid.

4. A device of the type described comprising a bearing having a pair of spaced transverse grooves in the surface thereof, solid dams in said grooves, means for resiliently pressing said dams from the bottom of said grooves, means for preventing the longitudinal escape of lubricant from the space between said dams, and means to intermittently supply the space between said dams with lubricating fluid.

5. A device of the type described comprising a bearing having a pair of spaced transverse grooves in the surface thereof, solid dams in said grooves, means resiliently pressing said dams from the bottom of said grooves, said bearing having a semi-circular groove at each end thereof connecting said transverse grooves, semi-circular dams in said grooves enclosing the space between said transverse dams, means resiliently pressing said dams from the bottoms of said grooves, and means to intermittently supply the surface between said dams with lubricating fluid.

6. The combination of a crank shaft having an internal lubricating channel connecting with the outer surface of the crank wrist journal, a connecting rod having a bearing mounted on said crank wrist journal, means for preventing the longitudinal escape of lubricant from said bearing, said bearing having spaced transverse grooves therein, dams in said grooves, and springs in said grooves pressing said dams against the journal surface, said channel being so arranged with respect to said journal as to supply lubricating fluid to the opposing surfaces between said dams when said surfaces are separated by their maximum clearance.

7. The combination of a crank shaft, having an internal lubricant supply system connecting to the wrist portion of said crank at its outer portion, a bearing surrounding said wrist portion, means for preventing the endwise escape of lubricant from between said bearing and wrist portion, and transverse dams in said bearing, at spaced intervals, pressed resiliently against the surface of said wrist portion to prevent the circumferential movement of lubricant, said means and dams including a surface opposite to the bearing surface which receives maximum pressure.

In testimony whereof, I affix my signature.

CHARLES Y. KNIGHT.